June 15, 1965  F. H. BATTLE, JR  3,189,905
AIRCRAFT LANDING SYSTEMS
Filed Jan. 16, 1962  2 Sheets-Sheet 1

INVENTOR
FREDERICK H. BATTLE, JR.
BY
ATTORNEYS

INVENTOR
FREDERICK H. BATTLE, JR.
ATTORNEYS

United States Patent Office 3,189,905
Patented June 15, 1965

3,189,905
AIRCRAFT LANDING SYSTEMS
Frederick H. Battle, Jr., Seaford, N.Y., assignor to Cutler-Hammer, Inc., Milwaukee, Wis., a corporation of Delaware
Filed Jan. 16, 1962, Ser. No. 166,643
9 Claims. (Cl. 343—108)

This invention relates to aircraft landing systems, and particularly to a flare-out computer for use therein.

A biangular landing system is described in application Serial No. 825,469, filed July 7, 1959, by Tatz and Battle for "Aircraft Landing System," now abandoned, and in application Serial No. 123,928, filed June 28, 1961, now Patent No. 3,157,877, which is a continuation-in-part thereof. As set forth in these applications, elevation guidance beam transmissions are produced at a pair of sites adjacent a runway and spaced therealong. The beam transmission from the front site may be scanning or fixed, and if scanning is coded in terms of its elevation angle. The beam from the rear site is narrow in the vertical plane and repeatedly scans in the vertical direction, and is coded in terms of its elevation angle. Azimuth guidance is provided by a conventional localizer beam or by a scanning beam employing the same techniques used for elevation.

The path that an aircraft should follow in performing a landing maneuver may be divided into two portions. namely, glide and flare-out portions. During the glide portion, a straight line path at an angle determined by the characteristics of the aircraft normally suffices. With a scanning beam employed at the front site, the angle may be selected as desired, whereas with a fixed front site beam transmission the angle is determined by the characteristics of the ground installation. At a suitable transition point during the landing maneuver, commonly referred to hereinafter as the "switch-over" point, the flare-out maneuver begins. During flare-out, the rate of descent is gradually reduced so that the aircraft contacts the runway sufficiently gently and smoothly.

As described in the aforesaid applications, the beam from the front site may be utilized in the aircraft to establish the initial glide path, the scanning beam from the rear site may be used to establish the flare-out path, and both beams used to determine the switch-over point. Several types of computers are described for determining the switch-over point and computing a suitable flare-out path.

In application Serial No. 140,134, filed September 22, 1961, by Tatz for "Aircraft Landing Systems," computers are described utilizing the angle from the rear site and the rate of change thereof to compute flare-out relationships to a fixed small terminal angle prior to touchdown.

The present invention is directed to a simple flare-out computer which develops a reference signal for use during the flare-out maneuver, and the measured angle relationship to the rear site is compared with the reference signal to develop an error signal. The error signal may be indicated to the pilot for manual guidance, or supplied to an auto-pilot control for automatic landing.

The computer of the invention provides a generally exponential type of path from switchover to the desired terminal angle, but modified to provide a selectable rate of change of angle immediately after switchover without unduly prolonging the flare-out maneuver.

The invention will be described in connection with an embodiment thereof shown in the drawings, in which.

Figure 1:
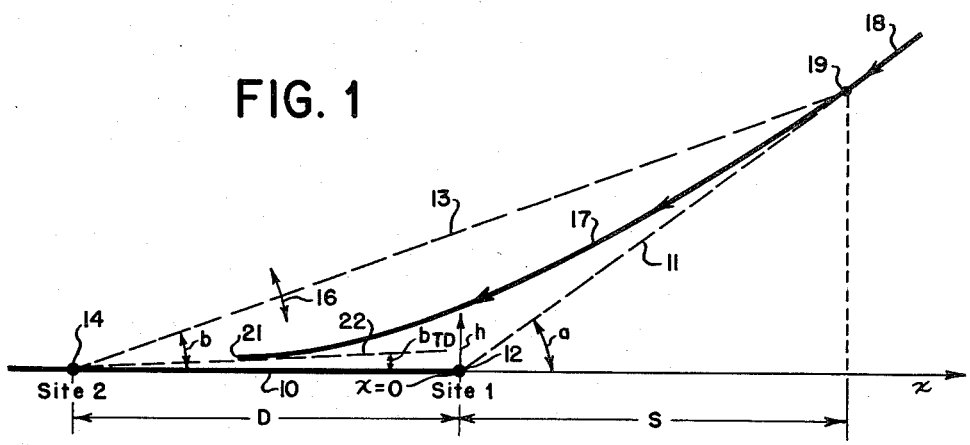
FIG. 1 illustrates a landing path for an aircraft utilizing biangular relationships.

Referring now to FIG. 1, a runway is represented at 10. At or near the front of the runway, at Site 1, is an antenna transmitting a guidance beam whose center line is shown at 11. The origin of this guidance beam is denoted 12. Partway down the runway, at Site 2, is an antenna transmitting another guidance beam whose center line is 13. The origin of this beam is denoted 14. In practice, the antennas will have a finite height, say, an effective height of the order of five feet, so that the beams will not originate actually at the surface of the runway. Also, the antennas will commonly be located somewhat to the side of the runway so as not to obstruct the runway.

The receiving antenna in the aircraft will commonly be considerably above the wheels, say ten to twenty feet. The heights of the transmitting and receiving antennas may be taken into account in establishing the flare-out path so that the aircraft substantially reaches the terminal angle prior to touchdown. Since commonly the point of touchdown will be a consideable distance in front of the rear site, and the switchover point will be considerably in front of the front site, in practice the beams may be considered to originate along the center line of the runway without substantial error.

For simplicity of presentation the beams from the two sites will be treated hereinafter as though they originated at the surface of the runway and along the center line thereof, since the actual physical situation in a given application may readily be taken into account by those skilled in the art when necessary.

As shown in FIG. 1, horizontal and vertical (height) distances are measured along rectangular coordinates $x$ and $h$. The origin could be chosen at either Site 1 or Site 2, but in this application it is assumed to be at Site 1, as indicated.

In the specific embodiment described hereinafter, it is assumed that a fixed front angle beam is employed, such as the present ILS glide scope now widely used in the United States and many foreign countries. The beam is usually fairly straight in the region in which it is used in accordance with this invention, that is, prior to switch-over, and the projection of this beam angle is assumed to intersect the runway at point 12. The beam angle is denoted $a$, and is commonly in the range of 2½ to 3°. If a scanning beam from Site 1 were employed, line 11 could be taken to be the beam angle actually employed during the glide portion of the landing maneuver.

The beam at the rear Site 2 is a scanning beam coded in terms of its elevation angle $b$, and the fact that it is scanning is indicated by the double-headed arrow 16. Consequently, with suitable decoding equipment in an aircraft, the angle of the aircraft from Site 2 can be continuously determined during the landing maneuver.

A landing path for the aircraft is shown at 17. Initially, during the glide portion 18 of the maneuver, an aircraft flies along a path making a substantially constant angle with respect to Site 1. The switchover from glide to flare-out portions is at point 19. As the aircraft proceeds past point 19, it will be observed that the slope of path 17 gradually decreases until shortly before the aircraft touches down at point 21. Point 21 is somewhat above the runway 10 due to the height of the aircraft antenna above the landing wheels.

In the specific embodiment described hereinafter, the reference signal is designed to provide a shallow terminal angle prior to touchdown, as shown by line 22. This terminal angle, denoted $b_{TD}$, may be selected with respect to the aircraft characteristics so that the rate of descent at touchdown will not exceed a prescribed rate determined by the ruggedness of the plane and its use. For commercial airplanes, a rate of descent not exceeding about two feet per second is desirable, whereas for military planes it is sometimes considerably greater. For space vehicles an even greater rate of descent may be permissible. For many types of planes currently in use, an angle of approximately ½° is satisfactory.

Figure 2:
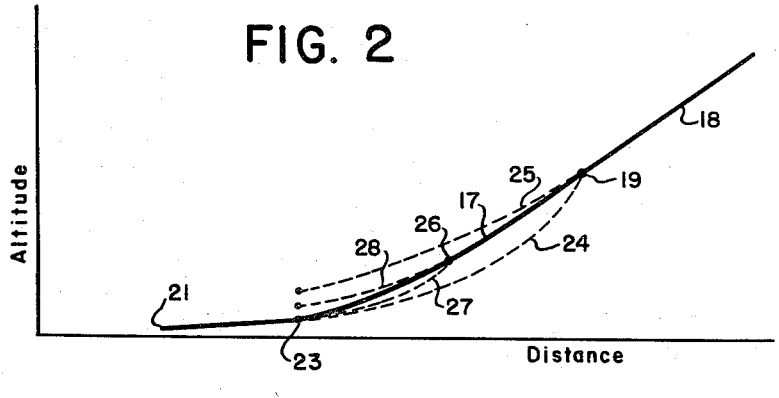
FIG. 2 illustrates qualitatively certain factors relating to the present invention.

Referring now to FIG. 2, it is desirable to avoid transients in the guidance signals supplied to the pilot or autopilot in switching over from glide to flare-out at point 19. This involves both angle and rate of change of angle considerations. If a simple exponential flare-out path were employed from point 19 to point 23, where the terminal angle is reached, it would be somewhat as shown by line 24. As is apparent, an abrupt change in the rate of descent would be required at the beginning of the flare-out. This would require the pilot to change the pitch attitude of his plane in the downward direction. Such a change is considered operationally undesirable. Either the same rate of descent immediately before and after the switchover point, or preferably a slight fly-up maneuver immediately after switchover, is desirable.

An exponential path could be selected which would produce either the same rate of descent or a slight fly-up signal at switchover. However, in general such a path would require too long a time before the final terminal angle is reached and require too gradual a rate of descent. Usually, a relatively short flare-out path is desired.

In accordance with the present invention, a reference signal is developed which permits a relatively short flare-out path to be employed, while at the same time avoiding a flydown signal at switchover, and preferably producing a small fly-up signal.

As specifically described hereinafter, an exponentially decaying signal component is developed which tends to prescribe a path such as shown at 24, and this component is modified by another exponentially decaying component to produce a resultant reference signal. At switchover point 19, the resultant signal tends to prescribe a path as shown by line 25. However, the modifying signal continuously decays during the flare-out so that the resultant path is as shown at 17. For example, at point 26, where a simple exponential would prescribe a path such as shown at 27, the modified signal tends to prescribe a path such as 28. Both signal components decay to negligible values by the time the final terminal angle is reached at point 23.

Figure 4:
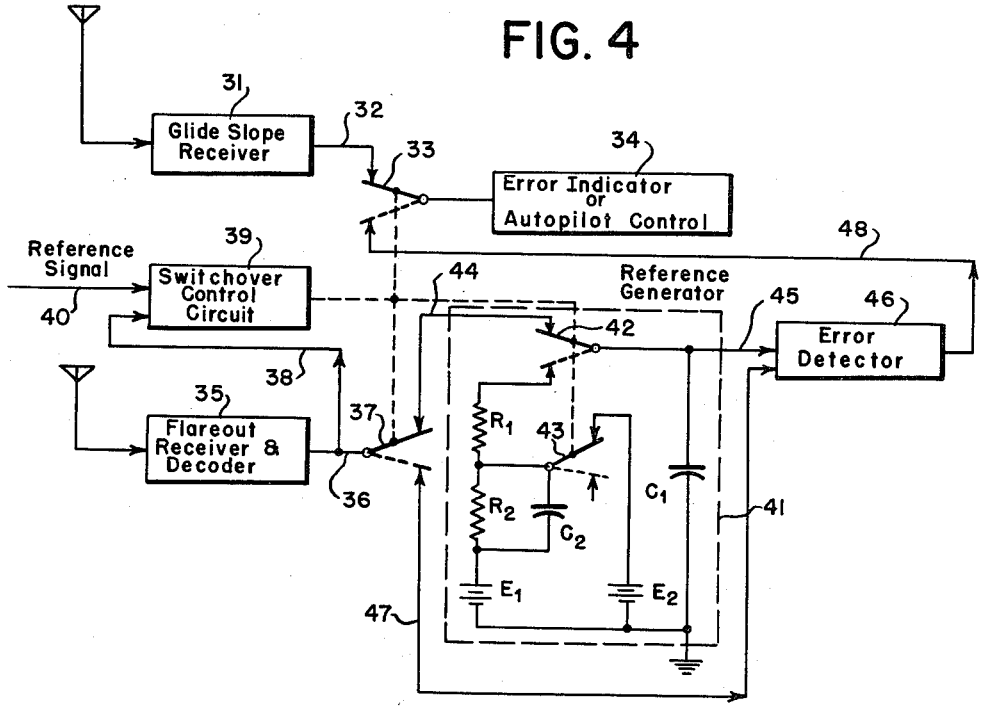
FIG. 4 is a circuit diagram of a reference generator in accordance with the invention, with related portions of the airborne equipment shown in block form.

Referring now to FIG. 4, a glide slope receiver is shown at 31 designed to receive the transmissions from Site 1 and develop an output signal in line 32 representing the error of the aircraft with respect to the glide slope path. If an ILS glide slope beam is employed, this may be a conventional ILS receiver. During the glide slope the signal in 32 is supplied through switch arm 33 to an error indicator or autopilot control 34.

A flare-out receiver and decoder 35 is employed to receive and decode the transmission from Site 2, thereby giving an output signal in line 36 varying as a function of the angle $b$ of the aircraft with respect to the rear Site 2.

The signal corresponding to angle $b$ is supplied through line 38 to a switch-over control circuit 39, which may be a comparator. A reference signal is supplied through line 40 to the switchover control circuit, and when the angle $b$ signal in line 38 reaches a predetermined value with respect to the reference signal, such as being equal thereto, the switchover control circuit 39 operates to move switches 33 and 37 to their dotted positions.

The point of switchover can be determined by triangulation, as illustrated in FIG. 1. The relationship between distance and the two angles is given by the following equation:

$$b = \left(\frac{x}{x+D}\right)a \qquad (1)$$

Strictly, the tangents of the angles should be employed, but for the small angles here involved the difference is negligible.

With a fixed glide angle $a$, a given value of angle $b$ corresponds to a given distance $x$. Thus, establishing switchover at a predetermined value of angle $b$ suffices. Accordingly the reference signal in line 40 of FIG. 4 may be made equal to the angle $b$ signal at the selected switchover point. Commonly the angle $b$ at switchover will lie between 1° and 2°.

From Equation 1 the rate of change of the angle $b$ can be expressed as:

$$\frac{db}{dt} = [D(dx/dt)(x+D)^{-2}]a \qquad (2)$$

At a considerable distance from the runway, angle $b$ will be only slightly less than angle $a$, but as the aircraft approaches the runway $b$ decreases, and the rate of change thereof increases.

Figure 3:
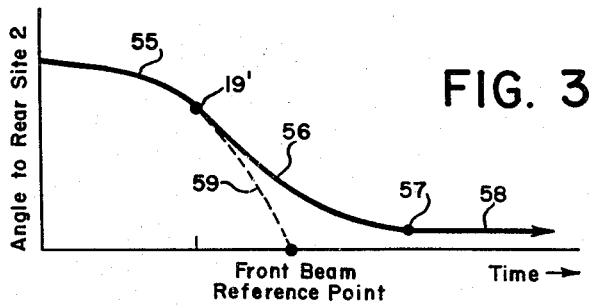
FIG. 3 shows angle relationships in accordance with the invention.

This is illustrated in FIG. 3, which shows the angle to the rear Site 2 as a function of time during the landing maneuver. Portion 55 represents the manner in which the aircraft angle to the rear site changes prior to the switchover point 19'. Although the angle with respect to the front site is constant, the angle to the rear site will be changing, and the rate of change (slope of the curve) increases as point 19' is approached. The remainder of FIG. 3 will be described later.

After switchover, angle $b$ will decrease with respect to its value at switchover, so that control circuit 39 will continue to hold switches 33 and 37 in their lower dotted positions.

If it is desired to establish the point of switchover at a particular altitude H, rather than at a particular distance, the following equation may be used, where $b_{sw}$ is the angle at switchover:

$$b_{sw} = \left(\frac{H}{H + D \tan a}\right)a \qquad (3)$$

For example, if D is 2500 feet and the altitude at the switchover point is to be 100 feet on a 2.7° glide slope angle, the value of $b_{sw}$ is 1.24°.

The reference generator shown in block 41 includes two RC time constant circuits composed of capacitors $C_1$, $C_2$ and resistors $R_1$, $R_2$. Battery $E_1$ primarily determines the fixed terminal angle signal and battery $E_2$ is provided to initially charge capacitor $C_2$.

Prior to switchover, switches 42 and 43 are in the upper positions shown. The angle $b$ signal in line 36 is delivered through switch 37, line 44 and switch 42 to capacitor $C_1$, so that the voltage on $C_1$ is always equal to the angle $b$ signal. Capacitor $C_2$ is charged to a potential equal to the difference between $E_2$ and $E_1$.

If switchover is determined by an exact equality of the angle $b$ signal with a constant reference signal in line 40, the reference signal could be used to charge $C_1$. However, the connections shown permit the use of other means for determining switchover.

At switchover, switches 42 and 43 are moved to their dotted positions by the switchover control circuit 39.

Capacitor $C_1$ then discharges at a rate determined by the circuit constants and delivers an output reference signal through line 45 to the error detector 46. Also, with switch 37 in its lower position, the angle $b$ signal is delivered through line 47 to the error detector. The error detector determines the difference between the two signals and, if an error exists, it is fed through line 48 and switch 33 (in its lower position) to the error indicator or autopilot control 34. The error detector may take any convenient form, such as a differential amplifier, voltage comparator, etc.

Figure 5:
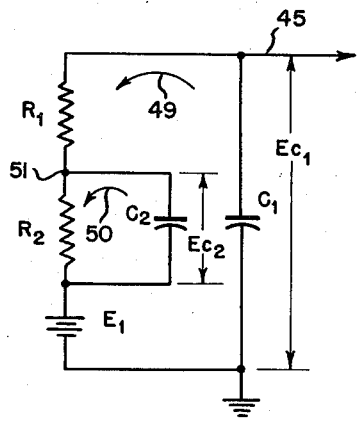
FIG. 5 is an explanatory diagram of the reference generator.

Referring to FIG. 5, the reference generator after switchover is shown. As before stated, capacitor $C_1$ will be charged to the angle $b$ signal at the instant of switchover, and $E_{C1}$ will be equal to this signal. If $C_2$ and $R_2$ were not present, $C_1$ would discharge through $R_1$ toward the potential of $E_1$ in a simple exponential manner. However, the circuit $C_2$, $R_2$ modifies this simple exponential decay, primarily by providing a continuously changing voltage toward which $C_1$ discharges during flare-out.

Voltage $E_{C2}$ will have an initial value determined by batteries $E_1$ and $E_2$. Thereafter, both capacitors will discharge as indicated by the arrows 49, 50. Capacitor $C_1$ will discharge toward the potential of point 51, which is $E_1+E_{C2}$. As time goes on, $E_{C2}$ will decrease due to the discharge of capacitor $C_2$ through $R_2$, and accordingly the potential of point 51 will approach $E_1$.

In general it is desirable to make $R_1$ large compared to $R_2$, $C_2$ large compared to $C_1$, and the time constant $K_2=R_2C_2$ equal or less than $K_1=R_1C_1$. $K_1$ is selected in view of the desired time for the flare-out maneuver, and a value of 4 to 7 seconds has been employed successfully in practice.

The voltage $E_1$ is selected in view of the scale factor and the desired final terminal angle. For example, with a scale factor of one volt equal to 1°, and a final terminal angle of 0.4°, $E_1$ would be 0.4 volt.

Thus, the discharge of $C_1$ through $R_1$ to the potential $E_1$ may be considered to be the principal circuit establishing the reference voltage, but is modified by the exponential decay of $C_2$ through $R_2$.

The equation representing output reference voltage $E_{ref}$ in line 45 is as follows, where $E_{sw}$ is the voltage across $C_1$ at switchover:

$$E_{ref}=(E_{sw}-E_1)e^{-\frac{t}{K_1}}-E_{c2}e^{-t\left(\frac{1}{K_1}+\frac{1}{K_2}\right)}+E_{c2}e^{-\frac{t}{K_2}}+E_1 \quad (4)$$

The first factor in Equation 4 is an exponential decay of $C_1$ through $R_1$ from its initial voltage to $E_1$, and may be considered a reference signal component. The third factor represents the exponential decay of $C_2$ through $R_2$ from its initial potential. The second factor represents a cross-coupling between the two circuits. These second and third factors represent a modifying signal component. The fourth factor, $E_1$, is the final terminal voltage reached when both capacitors have discharged to negligible values.

FIG. 3, from point 19' onwards, may be considered to represent the reference signal in line 45, since the reference signal represents the angle from the rear Site 2 desired during the flare-out maneuver. Portion 56, from 19' to 57, represents the variation in the reference signal until the final value $E_1$ is reached, corresponding to the terminal angle desired. This final value is indicated by portion 58.

In FIG. 3 the slope of portion 56 is the same as that of 55 at switchover point 19'. The dash line 59 represents the corresponding angle variation which would exist if the constant glide slope were continued (no flare-out). Its slope is also the same as that of 56 at point 19', indicating a smooth transition from glide to flare-out.

The initial slope of portion 56 at point 19' may be selected by proper choice of the voltage $E_2$. $E_2$ is made sufficiently large so as to preset the charge on capacitor $C_2$ before switchover so that the rate of change of angle immediately after switchover is the same as that immediately before. Or, it may be made slightly greater so that the initial slope of portion 56 is slightly less than that immediately before switchover, resulting in a small fly-up signal at switchover.

The rate of change of angle $b$ at switchover can be calculated from Equation 2 if desired. Also, Equation 4 can be differentiated to obtain the slope of the reference signal. Assuming $K_1=K_2=K$, immediately after switchover when $t$ is approximately 0, the rate of change of the reference angle may be expressed as:

$$-\dot{b}_{sw}=\frac{b_{sw}-E_1-E_{C2}}{K} \quad (5)$$

Since $b_{sw}$ is preselected (for example in accordance with Equation 3), $E_1$ is preselected to provide the desired shallow terminal angle, and $K$ is selected to permit the computer to settle down at the final value $E_1$ before touchdown, it is seen that the initial value of $E_{C2}$ affords a control over the early angle rate. This in turn is equal to $E_2$ minus $E_1$. With the numerical figures given above, it has been found operationally adequate in one particular application to set $E_{C2}$ between 0.15 and 0.2 volt less than $(E_{sw}-E_1)$.

The biasing effect of $E_{C2}$ reduces the magnitude of the early angle rate and permits the use of a low value of $K$ (for example, about ⅓ of the time to go to touchdown) while avoiding an undesirable steepening of the trajectory relative to an extension of the glide slope immediately after switchover.

As the flare-out proceeds, it will be seen from Equation 4 that there is a natural decay of all the exponential terms toward zero, and the reference signal settles out at a final terminal angle determined by $E_1$, with negligible rate of change of angle thereafter.

As specifically illustrated in FIG. 4, the reference signal is compared with the measured flare-out angle signal to produce an error signal in line 48 which represents the angle error. This in general suffices as an error indication for manual piloting. However, for autopilot control, it is usually desirable to have a rate signal. The angle error signal can be differentiated to provide a rate signal, as is well known in computer practice.

In the specific embodiment of FIG. 4, a fixed glide angle and fixed switchover reference signal are employed. In the event that the front site beam is scanning, a particular angle will usually be chosen for the glide slope, and the switchover may be determined by comparing the selected glide angle with the angle from the rear site. If the glide angle is always the same, the computer constants may be selected for that glide angle. Or, if provision is made for the pilot to select a desired glide angle, suitable provision may be made to change the constants in the computer to give a flare-out reference signal corresponding to the selected glide angle.

The invention has been described in connection with a specific embodiment thereof. It will be understood that changes may be made in the specific computer circuit described, within the broad scope of the invention, and that other portions of the embodiment described may be modified as meets the requirements of a particular application.

I claim:
1. In an aircraft landing receiver producing guidance signals corresponding to elevation guidance beam transmissions from a plurality of sites adjacent a runway and spaced therealong, at least the signal corresponding to a rearward site beam transmission representing a function of the elevation angle of the aicraft from the site thereof as the angle changes during landing, a flare-out path computer which comprises
    (a) a circuit for producing a reference signal component gradually decreasing from an initial value during flare-out,

(b) a circuit for producing a modifying signal component gradually decreasing from a corresponding initial value during flare-out, (c) said circuits being interconnected to cause said modifying signal component to modify the rate of decrease of the reference signal component and produce a resultant reference signal, (d) means for establishing said initial values to produce an initial value of the resultant reference signal which corresponds to the rearward-site angle signal at the beginning of the flare-out, (e) and means for utilizing the reference signal and the rearward-site angle signal to produce an error signal for guiding the aircraft during flare-out.

2. In an aircraft landing receiver producing guidance signals corresponding to elevation guidance beam transmissions from a plurality of sites adjacent a runway and spaced therealong, at least the signal corresponding to a rearward site beam transmission representing a function of the elevation angle of the aircraft from the site thereof as the angle changes during landing, a flare-out path computer which comprises (a) a circuit for producing a reference signal component decaying from a first initial value toward a terminal value during flare-out, (b) a circuit for producing a modifying signal component decaying from a second initial value during flare-out, (c) said circuits being interconnected to cause the modifying signal component to change the terminal value toward which the reference signal component decays during flare-out and produce a resultant reference signal, (d) means for establishing said first initial value at a value corresponding to the rearward-site angle signal at the beginning of the flare-out, (e) and means for utilizing the reference signal and the rearward-site angle signal to produce an error signal for guiding the aircraft during flare-out.

3. In an aircraft landing receiver producing guidance signals corresponding to elevation guidance beam transmissions from a plurality of sites adjacent a runway and spaced therealong, at least the signal corresponding to a rearward site beam transmission representing a function of the elevation angle of the aircraft from the site thereof as the angle changes during landing, said receiver utilizing the signal corresponding to a front site transmission to provide guidance along a substantially constant glide angle prior to flare-out and including means for switchover of guidance from front to rearward site angle signals at a predetermined rearward site angle, a flare-out path computer which comprises (a) a circuit for producing a reference signal component decaying from a first initial value toward a terminal value during flare-out, (b) a circuit for producing a modifying signal component decaying from a second initial value during flare-out, (c) said circuits being interconnected to cause the modifying signal component to change the terminal value toward which the reference signal component decays during flare-out and produce a resultant reference signal, (d) means for supplying a signal to establish said first initial value at a value corresponding to said rearward site angle at switchover, (e) means for interrupting said supplying at switchover, (f) and means for utilizing said resultant reference signal and the rearward-site angle signal to produce an error signal for guiding the aircraft during flare-out.

4. Apparatus in accordance with claim 3 in which said second initial value is predetermined to reduce the rate of change of the resultant reference signal immediately after switchover with respect to the rate of change which would exist without said modifying signal component.

5. Apparatus in accordance with claim 3 in which said second initial value is predetermined to produce a rate of change in the resultant reference signal immediately after switchover which is not substantially greater than the rate of change of the rearward site angle signal immediately prior to switchover.

6. Apparatus in accordance with claim 5 in which the final terminal value of said resultant reference signal corresponds to a predetermined shallow terminal angle, and the reference and modifying signal components decay substantially exponentially with time constants predetermined so that the resultant reference signal substantially reaches said final terminal value prior to touchdown.

7. In an aircraft landing receiver producing guidance signals corresponding to elevation guidance beam transmissions from a plurality of sites adjacent a runway and spaced therealong, at least the signal corresponding to a rearward site beam transmission representing a function of the elevation angle of the aircraft from the site thereof as the angle changes during landing, a flare-out path computer which comprises (a) a first capacitance and a discharge circuit therefor including resistance, (b) a second capacitance and a discharge circuit therefor including a portion of said resistance, (c) means for charging said first capacitance to a first initial value corresponding to the rearward-site angle signal at switchover to flare-out, (d) means for charging said second capacitance to a second initial value prior to said switchover to reduce the rate of discharge of said first capacitance immediately after switchover with respect to the rate of discharge which would exist without the charged second capacitance, (e) means for disconnecting the charging means from said first and second capacitances at said switchover and allowing the capacitances to discharge through said discharge circuits, (f) and means for utilizing the signal on said first capacitance after switchover and the rearward-site angle signal to produce an error signal for guiding the aircraft during flare-out.

8. In an aircraft landing receiver producing guidance signals corresponding to elevation guidance beam transmissions from a plurality of sites adjacent a runway and spaced therealong, at least the signal corresponding to a rearward site beam transmission representing a function of the elevation angle of the aircraft from the site thereof as the angle changes during landing, said receiver utilizing the signal corresponding to a front site transmission to provide guidance along a substantially constant glide angle prior to flare-out and including means for switchover of guidance from front to rearward site angle signals at a predetermined rearward site angle, a flare-out path which comprises (a) a first capacitance and a discharge circuit therefor including first and second resistors and a voltage source connected in series, (b) a second capacitance and a discharge circuit therefor including said second resistor, (c) means for charging said first capacitance to a first initial value corresponding to the rearward-site angle signal at switchover to flare-out, (d) means for charging said second capacitance to a second initial value prior to said switchover predetermined to produce a rate of change of signal on said first capacitance immediately after switchover which is not substantially greater than the rate of change of the rearward site angle signal immediately prior to switchover, (e) switch means for disconnecting the charging means from the first and second capacitances and establishing said discharge circuits therefor at switchover, (f) and means for utilizing the signal on said first capacitance after switchover and the rearward-site angle signal to produce an error signal for guiding the aircraft during flare-out.

9. Apparatus in accordance with claim 8 in which the discharge time constants of the first and second capacitances are predetermined so that the signal on said first capacitance substantially reaches the voltage of said voltage source prior to touch-down.

No references cited.

CHESTER L. JUSTUS, *Primary Examiner*.